Aug. 27, 1957 G. I. THOMAS ET AL 2,804,570

ELECTROSTATIC STORAGE OF DIGITAL INFORMATION

Filed Feb. 4, 1952 2 Sheets-Sheet 1

INVENTORS:
G. I. THOMAS
B. W. POLLARD
ATTORNEYS:
Moore & Hall

INVENTORS:
G. I. THOMAS
B. W. POLLARD
ATTORNEYS:
Moore & Hall

United States Patent Office 2,804,570
Patented Aug. 27, 1957

2,804,570

ELECTROSTATIC STORAGE OF DIGITAL INFORMATION

Graham I. Thomas and Brian Watson Pollard, Hollinwood, England, assignors to National Research Development Corporation, London, England Application February 4, 1952, Serial No. 269,736

Claims priority, application Great Britain February 9, 1951

12 Claims. (Cl. 315—12)

Figure 1:
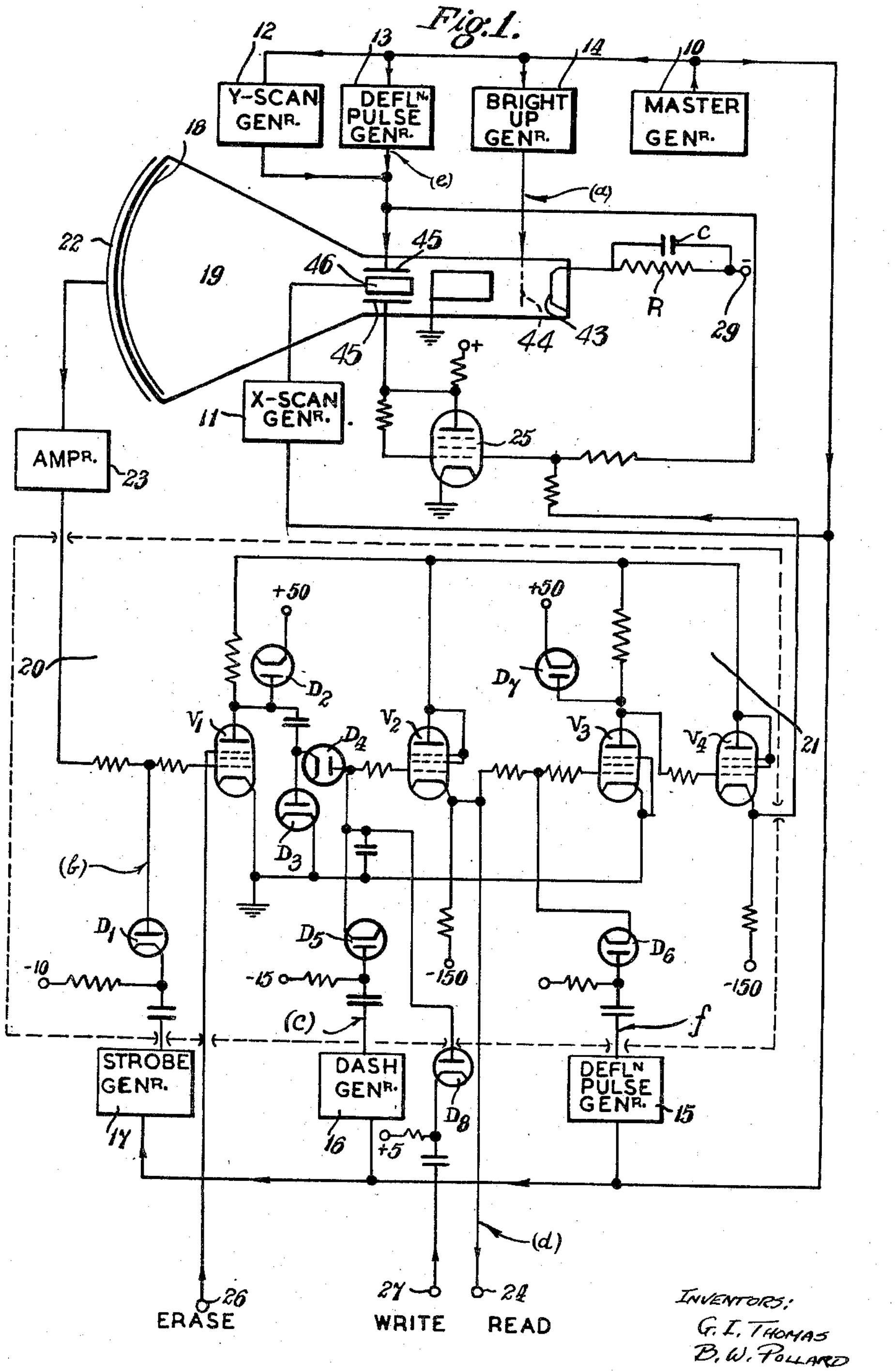

The present invention relates to the electrostatic storage of digital information, employing apparatus of the type in which a cathode ray beam is caused to bombard an elemental area of an electrostatic storage surface at a velocity such that initially the secondary emission exceeds the number of primary electrons reaching the surface whereby a positive charge is produced upon the elemental area. This charge is substantially neutralised, when required by the nature of the information to be stored, by causing the beam to release secondary electrons to the area. An electrostatic storage surface is any surface suitable for storing electrostatic charges for an appreciable length of time. Examples are the surface of a fluorescent screen of a cathode ray tube, the surface of a sheet of insulating material such as mica and the surface of a mosaic such as that commonly used in television cameras.

In recording binary digits it is usual to represent these by a positive charge and no charge respectively. Thus, a positive charge may represent the number "0" and no charge may represent the number "1." Storage apparatus of this type is for example described in a paper by F. C. Williams and T. Kilburn published in the Proceedings of the Institution of Electrical Engineers, part III, No. 40, March 1949, pages 81–100, and entitled, "A Storage System for Use with Binary-Digital Computing Machines."

In order to read stored information it is usual to switch the beam on for what is known as a "dot" interval, say 1 microsecond, upon the elemental areas on which recording has taken place, and a pickup plate capacitively coupled to the storage surface then receives a characteristic initial signal from which the identity of the stored digit can be determined. Thus, if the area was positively charged substantially no initial signal is received by the pick-up plate whereas if there was no charge upon the area a positive pulse is produced on the pickup plate.

It is usual to scan the beam over the recording surface in lines and to allot a certain part of each line to each digit, the beam being usually held stationary during the digit interval which may be for example 10 microseconds. In order to record the digit "0," the beam is switched on whilst directed upon an elemental area for the dot interval, and then remains switched off for the remainder of the digit interval. In order to record the digit "1" the beam is switched on again after the dot interval and is directed by one of various means to a part of the screen near to the elemental area. Secondary electrons from this adjacent area then pass to the elemental area and neutralise the charge thereon. As is explained in the paper previously mentioned, in order that secondary electrons should pass from a second area to a first area to neutralise the charge thereon it is found that the distance between the centres of such areas should not exceed a critical value; usually the critical value is about 1.33 $d$, where $d$ is the diameter of the elemental area.

It has been proposed to produce the secondary electrons required for neutralising the charge on the elemental area by switching the beam on while deflecting it a suitable distance in any convenient direction; to focus sharply a beam which previously bombarded the elemental area in a defocused condition, in which case the secondary electrons for neutralisation are derived from a central spot within the boundaries of the elemental area; or to cause the beam to trace out a circular path around the elemental area. For this neutralising operation the beam may be switched on by a "dash" pulse of say 4 microseconds duration.

It will be seen that with dot and dash intervals of 1 and 4 microseconds respectively the times for which the beam is switched on for writing a "0" and for writing a "1" are in the ratio of 1:5. Thus the average cathode current of the cathode ray tube will vary in an irregular fashion in accordance with the nature of the information that is being stored. This introduces in the output signal a D. C. component which causes difficulty in the amplifier and gate circuits. Moreover the irregular variation of the cathode current renders control of the beam intensity by automatic control of the cathode current very difficult. Without some automatic control of beam intensity it is found that frequent adjustment is necessary in order to obtain satisfactory operation of the storage tube.

The present invention has for its object to overcome or substantially reduce this difficulty by rendering the time for which the beam is switched on substantially independent of the nature of the information that is being stored, or at least far less dependent upon the nature of the information than has been the case hitherto.

Thus according to the present invention there is provided a method of recording digital information and of reading such information employing recording means of the type specified which comprises, in order to record one item of information on an elemental area of the storage surface, bombarding the elemental area with the cathode ray beam to produce a positive charge on the elemental area and subsequently at least partially neutralising the positive charge by secondary emission from another area of the surface which may lie within the outer boundary of the elemental area and, in order to record another item of information on the elemental area, bombarding the elemental area with the beam to produce a positive charge on the elemental area, subsequently at least partially neutralising the positive charge by secondary emission from another area of the surface which may lie within the outer boundary of the elemental area, and thereafter re-bombarding the elemental area to increase the positive charge thereon, and in order to read information stored on the elemental area bombarding the elemental area with the beam to generate in a signal plate associated with the storage surface a signal representative of a state of charge of the elemental area.

The beam is preferably arranged to be switched on for the same time in each digit period, irrespective of which of the items of information is being recorded.

In order that there may be no D. C. component in the signal generated in the signal plate it is necessary that the total charge upon the insulating surface should be independent of the information stored. Thus, for example, where the area from which are derived the secondary electrons which neutralise the charge on the elemental area lies outside the outer boundary of the elemental area, it should be arranged that a positive charge exists either on the elemental area or on the area from which are derived the secondary electrons which neutralise the charge on the elemental area, but not on both, and that the magnitude of the charge is the same in both cases.

Figures 2, 3, 4, 5, 6:
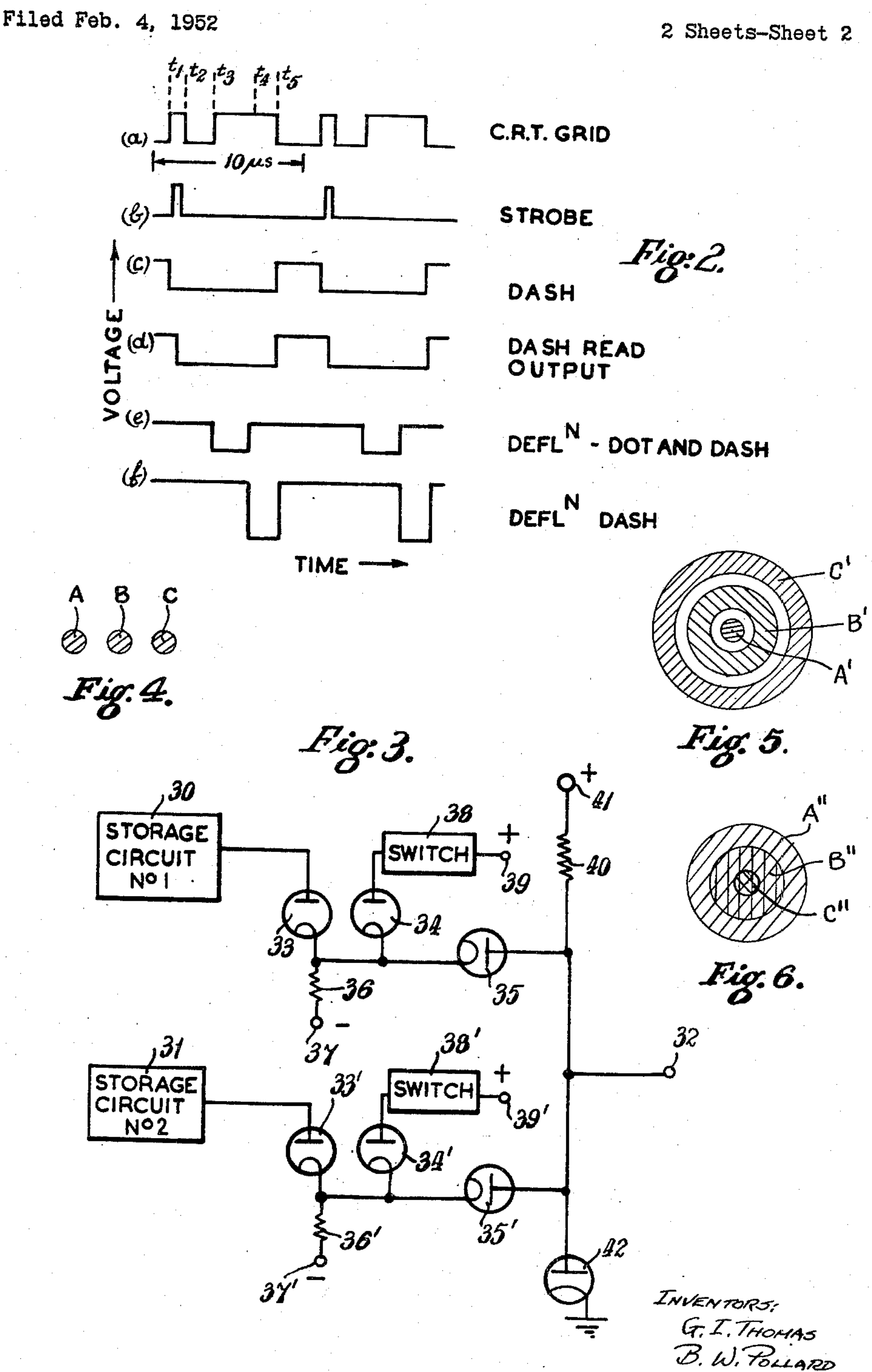

The invention will now be described with reference to the accompanying drawings in which Fig. 1 is a circuit diagram of an arrangement in accordance with the invention, Fig. 2 shows waveforms that appear in various points in Fig. 1, Fig. 3 is a circuit diagram showing the manner in which two or more storage tube circuits may be connected to a common output terminal, and Figs. 4 to 6 are diagrams showing various ways in which the bombardments by the cathode ray beam may be carried out. The waveforms will be referred to by the letters by which they are indicated in Fig. 2 and the points at which the waveforms appear in Fig. 1 are designated by the same letters.

A preferred form of apparatus according to the invention includes means whereby the beam can be directed upon three different points in a digit area of the insulating recording surface (that is the area allotted to the storage of a digit) namely A upon the elemental area whose state of charge represents the information stored, B upon a second area within the critical distance from the elemental area, and C upon a third area within the critical distance from the second area. In order to record the digit "0," the procedure may be A, B, A, whereas in order to record the digit "1," the procedure may be A, B, C. Thus referring to Fig. 4, for the digit "0" point A is first charged, then the charge is neutralized from B and finally the charge on A is restored. For the digit "1" point A is first charged, then the charge is neutralized from B and finally the charge at B is neutralized from C leaving C charged. The time for which the beam is switched on, and the total charge, may be made the same in either case.

The second and third areas (here represented by areas B and C) may be variously related to the said elemental area (area A). For instance, as already described with reference to Fig. 4, the beam may be deflected in a straight line from A to B and from B to C. Alternatively as shown in Fig. 5, the beam may be caused to sweep an area B′ constituted by a circle surrounding the elemental area A′ and for area C′ to sweep a circular path of greater radius than B′. In another arrangement shown in Fig. 6, the beam may be poorly focused for A″, may be focused to an intermediate extent for B″ and sharply focused for C″.

Another method according to the invention employs only two areas, say areas A and B in Figure 4, A′ and B′ in Figure 5 or B″ and C″ in Figure 6. In order to record one item of information, say 0, the area A, A′ or B″ is first bombarded by the cathode ray beam in order to charge such area positively and subsequently this charge is at least partially neutralized by secondary emission produced by bombarding area B, B′ or A″ respectively. Another item of information, say 1, is recorded by first bombarding area A, A′ or B″ to charge such area positively, subsequently at least partly neutralizing the positive charge by secondary emission produced by bombarding B, B′ or A″ respectively and thereafter re-bombarding the area A, A′ or B″ respectively to increase the positive charge thereon. Reading is accomplished in each case by bombardment of area A, A′ or B″ respectively.

Referring to Fig. 1, a cathode ray tube 19 has a cathode 43, control grid 44 and two pairs of deflecting plates 45 and 46. A master generator 10 serves to control the operation of an X-scan generator 11, a Y-scan generator 12, a deflection pulse generator 13, a bright-up pulse generator 14, a second deflection pulse generator 15, a "dash" generator 16 and a strobe pulse generator 17. The X-scan generator 11 generates in known manner, for example as described in the aforesaid paper, a stepped waveform applied to deflecting plates 46 whereby the beam is held stationary for each digit interval, for example 10 microseconds, and is moved rapidly forward to the next digit area. The Y-scan generator 12 is coupled to one of the deflecting plates 45 and is arranged in known manner to deflect the beam in the Y direction so that a number of parallel lines are traced out on an insulating screen 18 in the cathode ray tube 19. The bright-up generator 14 generates the waveform (*a*) in known manner, for example as described in application Serial No. 165,262, filed May 31, 1950, now Patent No. 2,769,935, issued November 6, 1956. The waveform (*a*) serves to switch the beam on at the maxima and off at the minima of the waveform. Gate circuits including a "read" unit 20 and a "write" unit 21 are provided and these may be constituted substantially as described in application Serial No. 119,306 filed October 3, 1949, now Patent No. 2,671,607, issued March 9, 1954, or 124,192 filed October 28, 1949. Those shown in the drawing are substantially identical with those described in application Serial No. 124,192.

In operation when a positive pulse is generated on a signal plate 22 associated with the screen 18 of the tube 19, this pulse, after amplification at 23 is strobed by a pulse from the generator 17 and allows a dash from the waveform (*c*) to pass from the generator 16 to a "read" terminal 24. The arrangement of Fig. 1 differs as to the gate circuit from the circuit referred to in application Serial No. 124,192, filed October 28, 1949, only in that when the gate circuit is conditioned by the positive pulse from the signal plate 22 it does not then pass a dash to the output of the write unit 21 but instead passes a pulse from the deflecting pulse generator 15, that is to say a pulse of waveform (*f*). These pulses (*f*) are then applied to the control grid of a valve 25 connected as an anode follower to deliver the pulses as deflecting voltages in push-pull to the Y-deflecting plate of the tube 19. It will be seen that the output of the generator 15 is applied to the diode D6, whereas in application Serial No. 124,192 a "dot pulse" is applied to the diode D6. The diode D6 shown in Fig. 1 is also reversed. The pulses (*e*) from generator 13 are also applied to the same plates.

In describing the operation of the circuit it will first be assumed that the regenerative loop, in this case extending from the signal plate 22 through amplifier 23, read unit 20, write unit 21 and valve 25 to the Y-deflecting plates 45, is interrupted by applying a suitable voltage to "erase" terminal 26. It will be assumed that the elemental area of the screen upon which the beam is to be directed at the instant under consideration has no charge and that a "0" is to be written, that is to say the elemental area is to be charged. In order to produce this condition it is not necessary to apply any signal to the "write" terminal 27 and the result is that no voltage is applied from the generator 15 to the Y-deflecting plate. Consequently when the beam is first switched on by waveform (*a*) at the time $t_1$, the beam bombards the elemental area (assumed to be the point A of Fig. 4) until the time $t_2$ when the beam is switched off. At time $t_3$ the beam is again switched on and is deflected by the waveform (*e*) applied to its Y-deflecting plates to the point B of Fig. 4. The beam remains turned on in this position until the time $t_4$ and during this time secondary electrons pass to the elemental area A and neutralise the charge thereon. At the time $t_4$ while the beam is still switched on it is returned by the waveform (*e*) to the elemental area A and again bombards this area until the time $t_5$ when the beam is switched off. In this way the elemental area A is left with a positive charge.

If a "1" is to be written, the dash waveform (*c*) is applied to the "write" terminal 27. This dash waveform appears at the cathode of the valve $V_2$ and conditions the "write" unit 21 to pass a pulse (*f*) from the deflection pulse generator 15 to the grid of the valve 25. The result is that at the time $t_4$ when the waveform (*e*) alone would return the beam from point B to the elemental area A the waveform (*f*) is applied to the deflecting plates and serves to deflect the beam to position C. The beam remains in this position C until just after the time $t_5$ when the beam is switched off, and during this time it neutralises the charge in position B. The charge on the elemental area A has been already neutralised by the beam when in position B and consequently the only charge now on the screen is at position C.

In order that the regeneration shall take place, the voltage applied to the "erase" terminal 26 is removed so that the regenerative loop is reconstituted. When a "0" is to be regenerated the beam is turned on on the elemental area by waveform (*a*) and no voltage which produces any result from the strobing by the pulse (*b*) is generated in the signal plate 22. The result is that the beam is deflected by waveform (*e*) from the elemental area A to point B and back to the elemental area A, the waveform (*f*) not being applied. In this way a charge is left upon the elemental area. If on the other hand "1" is to be regenerated a positive pulse will be strobed by the pulse from generator 17 and the gate circuit will be thus conditioned to pass a pulse (*f*) from the deflection pulse generator 15 to the valve 25 and in this way the beam is deflected first by the pulse (*e*) to point B and then by the pulse (*f*) to position C, the beam being switched off while it is in position C. In this way it will be evident that no charge will be left on the elemental area A since this charge has been neutralised while the beam was in position B. The deflection produced by the waveform (*e*) may be about 0.9 *d* and that produced by the waveform (*f*) may be about 1.8 *d*.

The cathode current of the tube 19 may conveniently be controlled by means of a resistor R having in parallel therewith a condenser C, this circuit being connected between the cathode and a terminal 29 which is connected to the negative terminal of a source of supply. The bright-up generator 14 must be arranged to bias the control electrode of the cathode ray tube relatively to the terminal 29 by approximately the voltage drop across the resistor R, which may for instance be 100–200 volts. The time constant of the circuit RC should be made long compared to the digit interval. In this way a cathode follower action is produced and the cathode current is maintained nearly constant. Since the beam is arranged to be switched on for the same time whether a "0" or a "1" is being recorded, the current during the time when the beam is switched on will also be substantially constant.

It is desirable to arrange that the tube is not blacked out at irregular intervals. Thus when several tubes are used to form a single store it is desirable that the particular tube from which information is required during operation should be selected by means of a gate circuit, the tube not selected continuing to regenerate.

Referring for example to Fig. 3, this shows two storage circuits 30 and 31 connected through two gate circuits to a common output terminal 32. The storage circuit 30 is connected through a gate circuit including three diodes 33, 34 and 35 whose cathodes are connected together and through a resistor 36 to a terminal 37 at negative potential. The anode of the diode 34 is connected through a switch 38 to a terminal 39 at positive potential and the output from the store 30 is applied to the anode of the diode 33. The anode of the diode 35 is connected through a resistor 40 to a terminal 41 at positive potential and directly to the output terminal 32. The output terminal 32 is also connected to the anode of a diode 42 whose cathode is connected to earth.

The gate circuit connecting the storage circuit 31 to the output terminal 32 is identical with that connecting the storage circuit 30 to the terminal 32, the various components of the gate circuit associated with the storage circuit 31 being given the same references as the corresponding components of the other gate circuit but with a dash superscript.

In operation the two switches are normally closed. This causes positive potential to be applied to the anodes of the diodes 34 and 34' whereby the cathodes of the diodes 35 and 35', and 33 and 33' are normally at positive potential and hence these diodes are nonconducting. This output from the two stores does not reach the output terminal 32 which is held at earth potential by conduction of the diode 42.

When it is desired to read the output from a store the appropriate one of the two switches 38 and 38' is opened. It will be assumed that the switch 38 is opened in this example. The opening of the switch 38 removes the positive potential from the anode of the diode 34 whereby the two diodes 33 and 35 become conducting, and hence the transmission of voltage variations from the circuit 30 to the terminal 32 is permitted.

Furthermore, although an arrangement has been described in which the output of the generator 13 and the "write" unit 21 are employed to effect displacement of the beam, these voltages may be used to vary the focus of the beam as shown in Figure 6 in such a manner that the beam is firstly poorly focused for A'', focused to an intermediate extent for B'', and is sharply focused for C''. Other applications of the invention will also be apparent to those skilled in the art.

We claim:

1. A method of recording digital information and of reading such information employing recording means of the type specified, the method comprising recording a first item of information on a first elemental area of the storage system by bombarding the first elemental area with the cathode ray beam to produce a positive charge on the first elemental area and subsequently at least partially neutralising the positive charge by secondary emission to said first elemental area, recording a second item of information on a second elemental area of the storage surface by bombarding the second elemental area with the beam to produce a positive charge on the second elemental area, subsequently at least partially neutralising the positive charge on said second elemental area by secondary emission to the second elemental area, and thereafter re-bombarding the second elemental area to increase the positive charge thereon, and in order to read information stored on the elemental areas bombarding the elemental areas with the beam to generate in a signal plate associated with the storage surface a signal representative of the states of charge of the elemental areas.

2. A method according to claim 1, wherein said secondary emission to said first elemental area is produced by bombarding with said beam a region adjacent said first elemental area and wherein the bombardment of said region is followed by bombardment with the beam of a further region adjacent the first-named region to release secondary emission from said further region to said first-named region.

3. A method according to claim 2, wherein the first-named region lies within the outer boundaries of said first elemental area and said further region lies within the outer boundaries of the first-named region.

4. A method according to claim 11, wherein the beam is switched on for substantially the same length of time in recording each of said items of information.

5. A method according to claim 11, wherein the total charge generated on the storage surface as a result of the recording of said first item of information is substantially the same as that generated as a result of the recording of said second item of information.

6. A method of recording digital information employing a cathode ray tube having a storage surface, comprising recording a first digit on a first elemental area of said surface by bombarding with the cathode ray beam first said elemental area, later a first region of said surface adjacent said elemental area and still later said elemental area, and recording a second digit on a second elemental area of said surface by bombarding with the cathode ray beam first said second elemental area, later a second region of said surface adjacent said elemental area, and still later a third region of said surface closer to said second region than to said second elemental area.

7. A method according to claim 6, wherein said elemental areas are annular in shape, said first region lying within said first elemental area, said second region lying within said second elemental area, and said third region lying within said second region.

8. A method according to claim 6, wherein the durations of said bombardments in recording said first and second digits are substantially equal.

9. Apparatus for storing digital information comprising a cathode ray tube, cathode ray beam producing means and an electrostatic storage surface within the envelope of said tube, beam deflecting means including a stepped sawtooth wave generator for directing the cathode ray beam of said tube successively and in steps towards digit storage areas of said surface during successive intervals of time, beam clontrol means responsive to voltages applied thereto to effect bombardment by said beam of predetermined portions of each said storage area, generating means for generating two sequences of control voltage, namely a first sequence including a first voltage value occurring during an early part of each of said intervals of time followed by a second voltage value different from said first voltage value, and a second sequence including said first voltage value occurring during an early part of each of said intervals of time, followed by said second voltage value occurring during an intermediate part of each of said intervals of time and by a third voltage value different from said first and second voltage values and occurring during a late part of each of said intervals of time, and means coupling said generating means to said beam control means, said coupling means including means responsive to information to be stored to select the appropriate one of said sequences for application to said beam control means.

10. Apparatus according to claim 9, wherein said beam control means are beam deflecting means.

11. Apparatus according to claim 9, wherein said beam deflecting means scan said beam over a row of said storage areas and wherein said beam control means comprising further beam deflecting means, deflecting said beam at an angle to the direction of said scan.

12. Apparatus according to claim 9, comprising means for switching said beam on during each of said intervals of time for a time which is independent of which of said sequences is selected.

References Cited in the file of this patent

UNITED STATES PATENTS

| | | |
|---|---|---|
| 2,402,058 | Loughren | June 11, 1946 |
| 2,559,078 | Kell | July 3, 1951 |
| 2,570,858 | Rajchman | Oct. 9, 1951 |
| 2,642,550 | Williams | June 16, 1953 |
| 2,660,669 | West | Nov. 24, 1953 |

OTHER REFERENCES

Williams and Kilburn: "A Storage System for use with Binary Digital Computing Machines," an article published in the Proceedings of the Electric Engineers, vol. 86, part III, March 1949, pages 81–100.